Patented Dec. 4, 1951

2,577,538

UNITED STATES PATENT OFFICE 2,577,538

PROCESS FOR THE PRODUCTION OF
VITAMIN-A ETHERS AND ESTERS

Nicholas A. Milas, Belmont, Mass., assignor to
Research Corporation, New York, N. Y., a corporation of New York No Drawing. Application September 29, 1948,
Serial No. 51,863

9 Claims. (Cl. 260—491)

In many of my previous patents in this field, I have described several processes for the conversion of vitamin A intermediates which contain the carbon skeleton structure of vitamin A ethers and esters and hydroxyl groups as shown in structures (I) and (II) in which R represents an alkyl or an acyl group into the corresponding vitamin A ethers and esters.

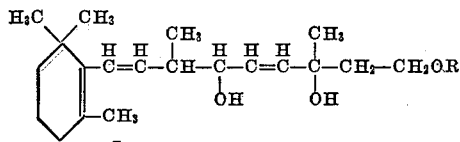

I

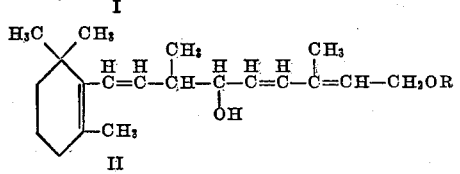

II

In the same patents I have shown that these products were synthesized by the following general steps:

Step I.—β-Ionone (III) was condensed at low temperatures with ethyl chloroacetate in the presence of solid sodium methoxide or ethoxide; the condensation product (IV) hydrolyzed with alcoholic alkali and the glycidic acid (V) recovered, after acidification, decarboxylated either by heating alone or with pyridine to give a product to which was assigned structure (VI) as proposed by Ishikawa and Matsuura (Sci. Rep. Tokyo Bunrika Daigaka, 3A, 173 (1937)) who were the first to investigate this reaction.

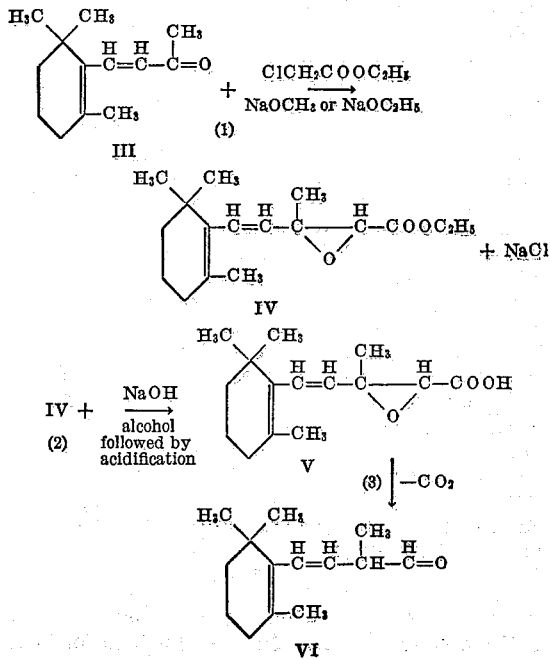

Subsequently, however, Heilbron et al. (J. Chem. Soc., 1942, 727), published on the basis of spectroscopic evidence, a slightly different structure (VII) for the same product. A third possible structure (VIII) for the same product was also published by the applicant (U. S. Patent 2,369,163, February 13, 1945).

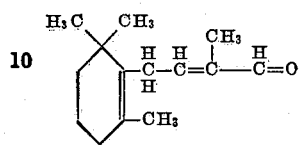
VII

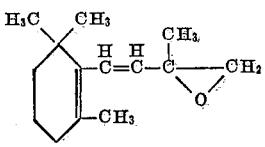
VIII

In view of more recent experimental evidence, Milas et al. (J. Am. Chem. Soc., 70, 1584 (1948)) concluded that structure (VI) best represents the properties of this key intermediate although on standing it may slowly rearrange to an isomer having structure (VII).

Step II.—When this aldehyde was condensed with the Grignard of compounds (IX) or (X) glycols (XI) or carbinols (XII) were produced

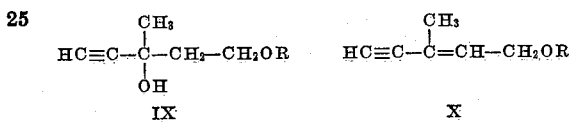

IX    X respectively. When these acetylenic glycols or carbinols were selectively hydrogenated compounds (I) and (II) resulted in

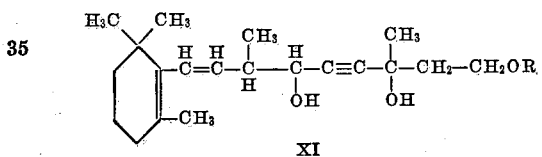

XI

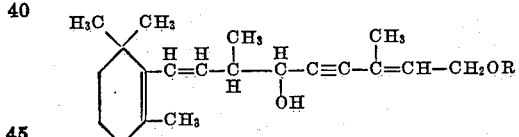

XII which R represents an alkyl or an acyl group.

Subsequent to the issuing of applicant's patents, Isler et al. (Experientia, 2, 31 (1946); Helv. Chim. Acta, 30, 1911 (1947)) published similar general procedures for the preparation of compounds (I) and (II) except that the alternative structures (XIII) and (XIV) which are derivable from the alternative structure (VII) of the aldehyde were used.

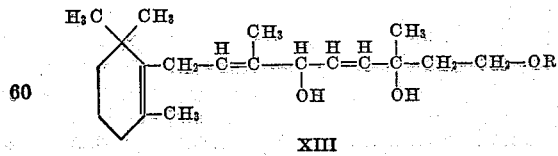

XIII

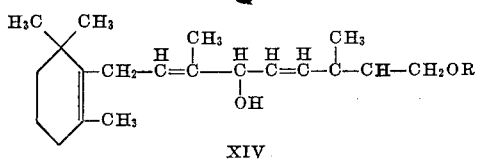

XIV

In the same patents the applicant described several processes for the conversion of the glycols (I) or (XIII) and the carbinols (II) or (XIV) into biologically active vitamin A products of the general structure (XV) in which R again represents an alkyl or an acyl group. In some of these

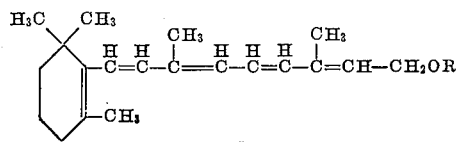

XV processes phosphorus halides and thionyl chloride are used together with an organic base like pyridine to substitute the alcoholic groups present in the intermediates by halogen and thereby to convert the intermediates into the corresponding halogen derivatives. During this reaction spontaneous dehydration or dehydrohalogenation occurs as described in my more recent publication (Milas, "Vitamins and Hormones," 5, 22–23 1947)) resulting in the direct production of the vitamin A ethers and esters.

The present invention is a simple and a direct process for the conversion of vitamin A intermediates of the type (I), (II), (XIII), and (XIV) in one step into high yields of vitamin A derivatives of type (XV).

The present process consists essentially in heating to not higher than the boiling point of pyridine and in an inert atmosphere such as nitrogen in the presence of small amounts of antioxidants such as hydroquinone, the vitamin A intermediate (I, II, XIII or XIV) with an equivalent quantity of an acid salt of a tertiary base like pyridine, quinoline, dimethylaniline, etc. in pyridine alone as a solvent or in a mixed solvent consisting of approximately equal proportions of pyridine and any one of the compounds taken from the group of allyl formate, acetate, or propionate or geranyl acetate, diallyl ether or other allyl mixed ethers or geranyl ethers or even benzyl esters or ethers. These ethers or esters together with the pyridine serve to minimize the decomposition of the vitamin derivatives so produced into anhydrovitamin A which is relatively inactive when tested biologically. When the crude product from the present process is recovered and freed from solvents and other inert products, it shows conversion to vitamin A derivatives as high as 70% of the theoretical as determined spectroscopically using the characteristic vitamin A band at 3260 Å.

A variety of acid salts of tertiary organic bases may be employed in this process. The hydrofluorides, hydrochlorides, hydrobromides, hydroiodides, acid sulfates, benzene sulfonates, p-toluene sulfonates, trichloroacetates, etc. of pyridine, quinoline, alpha, beta and gamma picolines, alkyl derivatives of pyridine, and quinoline, isoquinoline, acridine, dimethylaniline, trialkylamines, e. g. trimethyl, triethyl, trinaphthyl and triallylamines, morpholine, etc.

The invention is not limited to any theory as to the mechanism of the dehydration. However, according to modern interpretation, the dehydration may proceed through intermediate carbonium ions (XVI and XVII) and which will, due to their instability, rearrange to give the final vitamin A product and hydrogen ion. This may be illustrated as follows:

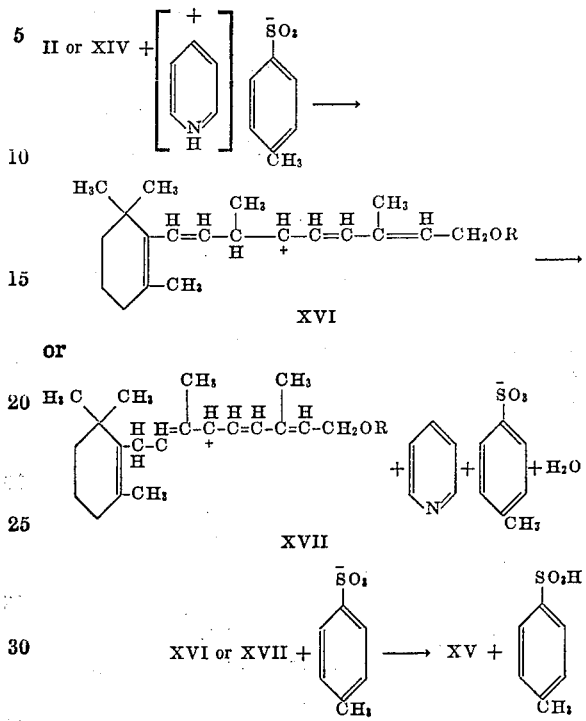

This interpretation which is widely accepted at present to explain the dehydration of simple carbinols under the influence of the type of reagents used in this invention accounts for the results obtained irrespective of the relationship of the hydroxyl groups to the double bonds present in the original molecule. The postulation of an allylic shift prior to the dehydration is not essential in this mechanism.

The invention is illustrated by the following examples.

*Example 1*

Pyridine hydrobromide was prepared by adding 3 g. of dry hydrogen bromide gas to 40 g. of anhydrous pyridine contained in a three-necked round-bottomed flask. The flask with its contents was then attached to a mercury sealed stirrer, a condenser and a dropping funnel. The air in the system was replaced by pure nitrogen, and while stirring 4.7 g. of glycol ether I or XIII (R=ethyl) in 20 cc. of benzene and 10 cc. pyridine was added at once. The mixture was slowly heated to a gentle reflux and kept at this temperature for three hours. The mixture turned yellowish-brown. At the end of this period, the mixture was cooled to room temperature and added in small portions to a mixture of 200 cc. petroleum ether and an equal volume of concentrated salt (NaCl) solution in water. The petroleum ether layer separated and was washed once with water and several times with 5% phosphoric acid solution to remove the excess pyridine. Finally the petroleum ether layer was dried over anhydrous sodium sulfate, filtered and the solvents removed under reduced pressure. A highly viscous orange liquid (3.8 g.) remained. This gave a deep blue color with antimony trichloride in chloroform and an $E_{1\,cm.}^{1\%}$ (3260–3280 Å)

value of about 740 which is equivalent to over 45% conversion. For further purification the crude product can be partitioned between 90% methanol and petroleum ether whereby the unconverted glycol remains in the methanol layer while the vitamin A ether (compound XV, R=ethyl) is mainly in the petroleum ether layer. By repeating this process two or three times, the vitamin A ether can be obtained in relatively pure form. If desired, other methods may be employed such as chromatographic adsorption for the purification of the crude material.

*Example 2*

Example 1 was repeated except that 80 g. of pyridine, 8 g. of hydrogen bromide, 15 g. of the glycol I or XIII (R=ethyl) in 100 cc. of diallyl ether were used instead of the 40 g. of pyridine, 3 g. of hydrogen bromide and 4.7 g. of glycol I. The mixture was gently refluxed for about four hours then cooled and the product worked up as before. A conversion yield of vitamin A ethyl ether of about 50% of the theoretical yield was obtained.

*Example 3*

A mixture of 4 g. of carbinol II or XIV (R=methyl) 50 cc. of pyridine, 1 g. of hydrogen bromide, 100 cc. of diallyl ether and 10 mg. of hydroquinone was refluxed in nitrogen for two hours. The product was then recovered as in the case of the previous examples. The crude product was found to contain about 27% of vitamin A methyl ether (compound XV, R=methyl) as estimated spectroscopically using the 3260 Å. band. This sample was also tested biologically and was found to contain 526,500 U. S. P. vitamin A units per gram.

*Example 4*

About 1.7 g. of dry hydrogen chloride, generated by dropping conc. sulfuric acid into conc. hydrochloric acid and dried with calcium chloride, was passed over 150 g. of anhydrous pyridine in a 500 cc. three-necked round-bottomed flask. The flask, after being cooled to room temperature was connected to a mercury sealed stirrer, a dropping funnel and a condenser. About 0.1 g. of hydroquinone was added to the mixture. Pure nitrogen was allowed to displace all air in the apparatus, then while stirring the mixture, 11.42 g. of hemiacetate II or XIV (R=—COCH$_3$) in 20 cc. of high boiling petroleum ether was added rapidly to the mixture. Stirring was continued while the mixture was slowly brought to a reflux and kept at this temperature for 1.5 hours. At the end of this period the mixture turned brown. It was then cooled to room temperature, diluted with a concentrated salt solution (NaCl in water) and extracted with 2×300 cc. of n-pentane. The pentane extract was then washed twice with water and several times with a 10% solution of tartaric acid to remove the pyridine. Finally, it was dried over anhydrous sodium sulfate overnight at 0°. Pure nitrogen was used in all operations including extractions. The n-pentane mixture was then filtered under nitrogen and the filtrate analyzed spectroscopically. It was found to have a prominent band at 3260 Å.;

$E^{1\%}_{1cm.}$, 1190

This corresponds to over 70% conversion as vitamin A acetate based on 9.6 g. of recovered crude product. Further purification of this ester of vitamin A may be effected by partitioning between 90% methanol and n-pentane or by chromatography. The product also gives a deep blue color with antimony trichloride in chloroform characteristic of vitamin A derivatives.

*Example 5*

To 200 g. of pyridine contained in a three-necked round-bottomed flask was added 3.6±.2 g. dry hydrogen chloride. The flask and its contents was connected to a mercury sealed stirrer, a condenser and a dropping funnel and pure nitrogen was allowed to displace all the air in the apparatus. While the mixture was being stirred, a solution of 25 g. of the hemiacetate II or XIV (R=COCH$_3$) in about 100 cc. of pyridine was added rapidly to the mixture. Stirring was continued while the mixture was slowly heated to a gentle reflux. The temperature of the mixture was maintained at 116° C. The reaction was allowed to proceed for 1.5 hours then the mixture was cooled to room temperature and worked up as in Example 3. About 19 g. of the product was recovered having an $E^{1\%}_{1cm.}$ (3260 Å)

of 842 which corresponds to about 54% conversion calculated as vitamin A acetate.

*Example 6*

Repetition of Example 5 using pyridine p-toluene sulfonate instead of pyridine hydrochloride gave identical results.

I claim:

1. Process for the dehydration of a compound of the group consisting of

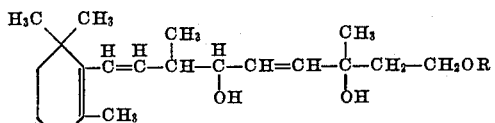

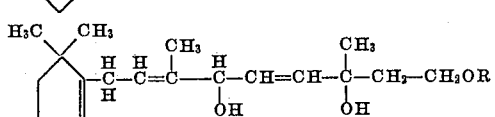

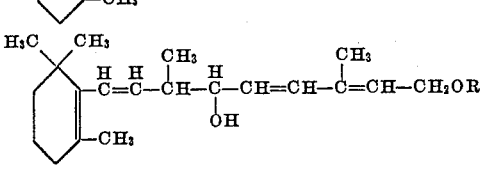

and

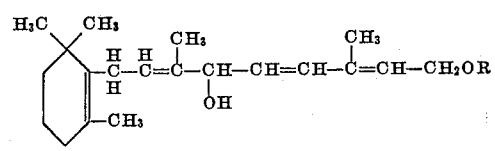

to produce vitamin A products in which R stands for a member of the group consisting of lower alkyl and lower acyl groups which comprises causing the said compound to react with an acid salt of a tertiary base in the presence of pyridine as a solvent.

2. Process as defined in claim 1 in which R is an acyl group.

3. Process as defined in claim 1 in which R is a lower alkyl group.

4. Process as defined in claim 1 in which the tertiary base is pyridine.

5. Process as defined in claim 1 in which the acid is hydrogen bromide.

6. Process as defined in claim 1 in which the acid is hydrogen chloride.

7. Process as defined in claim 1 in which the acid is p-toluene sulfonic acid.

8. Process as defined in claim 1 in which the reaction is carried out in the presence of an additional solvent taken from the group consisting of allyl ethers and esters, geranyl ethers and esters and benzyl ethers and esters.

9. Process as defined in claim 1 in which the reaction is carried out in the presence of an antioxidant.

NICHOLAS A. MILAS.

REFERENCES CITED

The following references are of record in the file of this patent:

UNITED STATES PATENTS

| Number | Name | Date |
| --- | --- | --- |
| 2,369,158 | Milas | Feb. 13, 1945 |
| 2,369,168 | Milas | Feb. 13, 1945 |
| 2,382,085 | Milas | Aug. 14, 1945 |
| 2,451,729 | Isler | Oct. 19, 1948 |

OTHER REFERENCES

Whitmore et al.: J. Am. Chem. Soc., vol. 67, pages 2158–2160 (1945).